United States Patent [19]
Stapley

[11] 4,355,593
[45] Oct. 26, 1982

[54] ANIMAL LITTER

[75] Inventor: Ronald B. Stapley, Bellevue, Wash.

[73] Assignee: Carnation Company, Los Angeles, Calif.

[21] Appl. No.: 809,985

[22] Filed: Jun. 27, 1977

[51] Int. Cl.³ .............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 3,286,691 | 11/1966 | McFadden | 119/1 |
| 3,675,625 | 7/1972 | Miller et al. | 119/1 |
| 3,735,734 | 5/1973 | Pierce et al. | 119/1 |
| 3,941,090 | 3/1976 | Fry | 119/1 |

OTHER PUBLICATIONS

"Sage Reduces Odors", *Animal Nutrition and Health*, Dec. 1971, p. 11.
Everett, T. H., ed., *New Illustrated Encyclopedia of Gardening*, New York: Greystone Press, vol. 2, pp. 119-120.

*Primary Examiner*—Robert P. Swiatek

[57] ABSTRACT

An animal litter having improved odor control properties comprising a major amount of an absorptive litter material and a minor amount of an odor control agent derived from sagebrush. The absorptive material may be an absorptive mineral, a fibrous organic material or a chlorophyll-containing grass. The odor control agent is ground sagebrush or sagebrush oil. The animal litter may contain from about 0.005%–10% by weight of the odor control agent.

16 Claims, No Drawings

ANIMAL LITTER

BACKGROUND OF THE INVENTION

This invention relates to animal litter having improved odor control properties and a process for producing such animal litter. More particularly, it relates to animal litter which contains a material derived from sagebrush in an amount sufficient to mask odors emanating from animal wastes or the litter base material.

Animal litter prepared for household pets and laboratory animals has been marketed for a number of years and has found wide acceptance. A large number of substances have been proposed for use as litter materials for animals. They include various types of minerals, such as silica, limestone, bentonite, kaolin, diatomaceous earth, etc., and fibrous organic materials, such as straw, corn cob pulp, peanut hulls, sugar cane stalks, and the like. Such materials are used primarily because of their high absorbency or affinity for moisture, a property which is essential in a litter material. However, such conventional materials suffer from the disadvantage that they do not suppress or mask odors emanating from animal waste materials.

In recent years, dried alfalfa pellets have been introduced for use as animal litter. This product has good moisture absorption properties, and its content of chlorophyll serves as a deodorizer of animal wastes deposited thereon. However, alfalfa pellet litter material suffers from the disadvantage that it exhibits a strong characteristic odor which many persons find objectionable, so that the material is unacceptable for many applications, particularly in confined areas such as apartments.

SUMMARY OF THE INVENTION

It has now been found that an animal litter having good moisture absorption properties can be provided with improved odor control properties by incorporating a minor amount of a sagebrush material with a particulate, absorptive litter material. The animal litter of this invention has a pleasant sage-like odor which provides effective odor control of animal wastes. The sagebrush material used as the odor control agent in the present invention may be particles of sagebrush obtained by grinding the leaves and stems of sagebrush plants, sagebrush oil obtained by extraction or steam distillation of the leaves and stems of sagebrush plants, or mixtures thereof, and is present in the animal litter in minor amounts, typically from about 0.005%–10% by weight. The bulk of the animal litter comprises an absorbent litter material, preferably in pelletized or other compacted form, which may constitute up to about 99.995% by weight of the litter product depending on the type of sagebrush material used. A variety of absorbent litter materials may be used, including absorptive minerals, fibrous organic materials and chlorophyll containing grasses and plants.

The odor control agent of this invention may be incorporated in the animal litter in a number of ways. For example, particles of ground whole sagebrush may be admixed with particulate absorptive material and the mixture formed into pellets of a desired size. Alternatively, ground sagebrush may be pelletized and mixed with pellets of the absorptive material. Also, sagebrush oil may be sprayed onto or otherwise contacted with pellets of the absorptive material or particles of the absorptive material which are then pelletized.

DETAILED DESCRIPTION OF THE INVENTION

The present invention includes an odor control agent suitable for use in conjunction with absorbent litter materials to provide an animal litter suitable for household pets and laboratory animals. The animal litter product of this invention comprises a major quantity of an absorbent litter material with a minor amount of an odor control agent obtained from sagebrush, and is in the form of consolidated particles or pellets.

The odor control agent used in the animal litter of this invention is a sagebrush material, namely, particles of sagebrush obtained by grinding the stems and leaves of sagebrush plants, or sagebrush oil, an essential oil obtained by the extraction or steam distillation of leaves and stems of sagebrush, or combinations thereof. Both of these materials, when present in the animal litter in minor amounts, provide the litter product with a pleasant sage-like odor which effectively masks odors emanating from animal wastes for a substantial length of time.

As used herein, the term "sagebrush" refers to the closely related groups of shrubs indigenous to the arid plains and mountains of the western United States which includes a number of species of the Artemisia genus of the Compositae family. Some of these species are A. tridentata, A. cana, A. nova, A. arbuscula, A. tripartita and A. rigida, which occur in varying amounts over about 422,000 square miles in the 11 western states. Artemisia tridentata, commonly referred to as big sagebrush, which includes several subspecies, such as A. tridentata tridentata, and A. tridentata vaseyana, has the widest distribution of any of the species. In general, sagebrush shrubs have foliage covered with varying degrees of lanate pubescence and are characterized by an aromatic smell.

According to one embodiment of the invention, the leaves and stems of dried sagebrush are ground, pulverized, or otherwise comminuted by conventional techniques, such as by grinding in a hammer mill, into relatively small particles. While the particle size of the ground sagebrush is not critical, it is generally preferred that the ground material pass through a Tyler No. 14 screen.

The resultant sagebrush particles are then combined with an absorbent litter material having a particle size that approximates the ground sagebrush to provide a mixture which contains from about 0.5% to 10% by weight of the sagebrush particles. A variety of absorbent materials, conventionally used in animal litter products may be used. These include absorbent minerals such as silica, limestone, diatomaceous earth and clays (e.g., bentonite, attapulgite, kaolin, etc.); fibrous organic materials such as wood fiber products, corn cob pulp, beet pulp, peanut hulls, sugar cane stalks, etc., and chlorophyll containing plants such as alfalfa. Alfalfa is a preferred material since it has good moisture absorption properties and contains chlorophyll which acts as an odor suppressant.

The mixture of ground sagebrush and absorbent material may be pelletized by using conventional techniques for pelletizing animal feeds, such as by extruding through a die from about 1/16 to ½ inch in diameter and cutting the extruded material into short lengths, typically from about 1/16 to about ½ inch. Other molding techniques, such as pelletizing machines, tabletting presses and the like may also be used. Conventional pelleting aids, such as clay, may be used if desired, generally in amounts of from about 1 to 5% by weight of the mixture. Optionally, a binder may also be included in the mixture. The pellets thus formed may contain from about 0.5% to about 10% by weight of sagebrush, preferably between about 1% and 4% by weight.

If desired, the ground sagebrush and the absorbent particles may be separately formed into pellets or granules by conventional pelletizing techniques and the separate pellets then combined to provide the animal litter product of this invention. In such a product, which comprises a mixture of sagebrush pellets and pellets of absorbent litter material, the sagebrush pellets may comprise from about 0.5% to 10% by weight of the animal litter.

According to another embodiment of the invention, sagebrush oil may be used as the odor control agent in the animal litter of this invention. Sagebrush oil is the water-immiscible essential oil obtained by extraction with a solvent such as ether, or steam distillation of the twigs and leaves of sagebrush. The sagebrush oil may either be absorbed or deposited on pellets of the absorbent material or on particles of the absorbent material which are subsequently pelletized. The sagebrush oil may be added to the absorbent material by any suitable technique such as by spraying, pouring, etc., and may be either in pure or diluted form, such as being dissolved in a volatile organic solvent. The sagebrush oil should be used in an amount sufficient to provide the animal litter with a level of from about 0.005% to about 1.0% by weight of sagebrush oil.

If desired, a suitable dye may be incorporated in the animal litter particles in an amount sufficient to impart a distinct coloration thereto.

The animal litter of this invention preferably is in the form of granules or pellets having a diameter and length of from 1/16 to ½ inch or more. It has good moisture absorption and odor control properties. In addition, it is non-toxic and non-irritating to animals.

Various other modifications and changes may be made with respect to the foregoing detailed description without departing from the spirit of the present invention.

What is claimed is:

1. An animal litter which comprises an absorptive litter material and a minor amount of a sagebrush material sufficient to mask odors emanating from animal wastes deposited on the litter.

2. The animal litter defined in claim 1 in which the sagebrush material is selected from the group consisting of sagebrush particles, sagebrush oil, and mixtures thereof.

3. The animal litter defined in claim 1 in which the sagebrush material is present in amounts of from about 0.005% to about 10% by weight.

4. The animal litter defined in claim 1 in which the absorptive litter material is selected from the group consisting of absorptive minerals, fibrous organic materials and chlorophyll-containing plants.

5. The animal litter defined in claim 4 in which the absorptive material is alfalfa.

6. The animal litter defined in claim 1 which comprises pellets formed of a mixture of said absorptive litter material and from about 0.5% to 10% by weight of sagebrush particles.

7. The animal litter defined in claim 1 which comprises a mixture of pellets of said absorptive litter material and pellets of sagebrush particles.

8. The animal litter defined in claim 1 which comprises pellets of said absorptive litter material having absorbed thereon from about 0.005% to 1.0% by weight of sagebrush oil.

9. A process for preparing an animal litter having improved animal waste odor inhibiting properties which comprises incorporating in an absorbent litter material an amount of a sagebrush material sufficient to mask odors emanating from animal wastes deposited on the litter.

10. The process defined in claim 9 in which the amount of said sagebrush material comprises from about 0.005% to about 10% by weight of the litter material.

11. The process defined in claim 9 in which said sagebrush material is selected from the group consisting of sagebrush particles, sagebrush oil and mixtures thereof.

12. The process defined in claim 9 in which animal litter is prepared by admixing dried sagebrush particles with particles of said absorptive litter material and forming said admixture into pellets.

13. The process defined in claim 9 in which dried sagebrush particles are formed into pellets and admixed with pellets of said absorptive litter material.

14. The process defined in claim 9 in which sagebrush oil is absorbed on pellets of said absorptive litter material.

15. The process defined in claim 9 in which said absorptive litter material is selected from the group consisting of absorptive minerals, fibrous organic materials and chlorophyll-containing plants.

16. The process defined in claim 9 in which the absorptive litter material is alfalfa.

* * * * *